US005791676A

United States Patent [19]
Jones

[11] Patent Number: 5,791,676
[45] Date of Patent: Aug. 11, 1998

[54] TRAILER HOOK-UP GAUGE FOR VERTICAL HITCH ALIGNMENT

[76] Inventor: Rodney D. Jones, 1077 Curtis Dr., Norco, Calif. 91760

[21] Appl. No.: 698,818

[22] Filed: Aug. 16, 1996

[51] Int. Cl.$^6$ ........................................... G01C 9/24
[52] U.S. Cl. ........................ 280/477; 33/379; 33/388
[58] Field of Search ........................ 280/477; 33/367, 33/379, 388, 389

[56] References Cited

U.S. PATENT DOCUMENTS

| | | | |
|---|---|---|---|
| 438,541 | 10/1890 | Green | 33/389 X |
| 1,059,396 | 4/1913 | Russell | 33/389 |
| 2,660,804 | 12/1953 | Lundy | 33/388 |
| 3,533,167 | 10/1970 | Thompson et al. | 33/210 |
| 3,857,188 | 12/1974 | Foster et al. | 33/388 |
| 4,658,508 | 4/1987 | Oberg | 33/333 |
| 5,035,441 | 7/1991 | Murray | 280/477 |
| 5,125,679 | 6/1992 | Delano | 280/425.2 |
| 5,269,554 | 12/1993 | Law | 280/477 |

*Primary Examiner*—Kevin Hurley

[57] ABSTRACT

A hook-up memory gauge (10), is a convenient aid in the vertical hitching alignment of a trailer with a tow vehicle. The hook-up gauge is mounted on the side of the trailer near the support legs or support stand so as to provide a settable reminder of the trailer fore-and-aft tilt angle at vehicle disengagement. The device comprises an arcuate spirit vial (38) with a small air bubble, and a squeeze-and-slide pointer (24) for recording tilt angle. For this embodiment, the hook-up gauge is capable of measuring five degrees of tilt angle in either direction. A glass or plastic spirit vial is fastened in a cradle which is part of a mounting base of thermosettable material or metal. The squeeze pointer is slidably mounted in arcuate guide slots on either side of the spirit vial. A slight clearance from the vial is provided so it can easily be moved in the elongate direction for centering over the air bubble. At hitch disengagement, the squeeze pointer is centered over the air bubble and released, resulting in a fixed position of the squeeze pointer to provide a convenient reminder of the particular tilt angle setting. At re-engagement, the squeeze pointer serves as a reference mark. Re-alignment and centering of the air bubble with the squeeze pointer, by raising or lowering the trailer support stand or legs, results in the correct angle for re-hitching.

3 Claims, 5 Drawing Sheets

TRAILER HOOK-UP GAUGE FOR VERTICAL HITCH ALIGNMENT

BACKGROUND FIELD OF INVENTION

The present invention relates to recreational vehicle and automotive accessories, and in particular, to a trailer or towed vehicle hitch alignment apparatus.

BACKGROUND DESCRIPTION OF PRIOR ART

U.S. Pat. No. 5,035,441 to Donald W. Murray (Jul. 30, 1991), shows a single sighting mast mounted to the towed vehicle and used for aligning the hitch components of the towing and towed vehicles. Prior to mounting, the mast is used to measure the height of the hitch ball above the ground, and with this measurement, the towed vehicle socket is vertically adjusted for proper clearance above the hitch ball. The mast is then employed as a sighting element for laterally backing and aligning the tow vehicle into the hitch position. Measuring the height of the hitch socket above ground by this method, involves substantially more physically demanding operations than the present invention.

U.S. Pat. No. 5,269,554 to Benjamin J. Law (Dec. 14, 1993) uses individual masts mounted to a tow vehicle hitch ball and to a trailer tongue, which consist of spring flexed, telescoping vertical leg members. These masts are used for alignment and communication relative to one another during the hitching operation. The sequence involves plumbing the vertical masts by use of an orthogonally mounted level, raising the trailer hitch socket higher than the tow vehicle hitch, and then backing the tow vehicle so that coaxial alignment of the two masts is achieved. At this point the hitch socket will be above the hitch ball, and may be lowered for engagement. This invention solves the lateral alignment problem but not the vertical, as with the present invention.

U.S. Pat. No. 5,125,679 to Charles G. Delano (Jun. 30, 1992) consists of a means for coupling and uncoupling a "goose-neck" trailer from a truck, using a guide-rail apparatus on the truck bed, a support stand mounted to the trailer face, and a hydraulic ram and ball receiver vertically and centrally mounted on the front and underneath side of the trailer goose-neck. Although this invention aids in coupling and uncoupling with a somewhat complex hydraulic and mechanical system, it does not provide a means for recording the relative position of the trailer and tow vehicle hitch at disengagement as does the present invention.

U.S. Pat. No. 3,533,167 to Thompson et al (Oct. 13, 1970), structurally combines a spirit level and inclinometer into a single unit with a plumb pin for proving the unit. A circular bubble capsule set in the body may be rotationally adjusted about its axis by the use of two screws to align a weighted degree indicator or inclinometer with a plumb pin. In addition to proving the level, the structure provides for plumb, level, or degree of angle registration and inclination. In contrast, the present invention provides an easy, settable, record of tilt angle.

U.S. Pat. No. 4,658,508 to Neil G. Oberg (Apr. 12, 1987), effectively discloses an invention which performs a function similar to the function of the trailer hook-up gauge. However, the structure of the Oberg invention is different from that of the present invention, in that it provides a continuous readout of tilt angle and does not include a pointer for marking the tilt angle between trailer and tow vehicle at disengagement.

OBJECTS AND ADVANTAGES

Accordingly, several objects and advantages of my invention are listed as follows:

One object of this invention is to provide a simple, easy to use apparatus, mounted on the side of a trailer, or trailer tongue, to provide a trailer fore-and-aft longitudinal tilt angle.

It is a further object of this invention to provide a fixed registration of the trailer tilt angle at the time of hitch disengagement for a subsequent reminder in reengaging the vehicle hitches.

Also, an object of this invention is to aid in preventing hitching mishaps in which the tow vehicle is accidentally backed into the trailer hitch due to improper height adjustment of the trailer support stand or legs.

Another object of this invention is to provide the capability of longitudinally leveling the trailer while maintaining a fixed angular registration of the relative disengagement hitch positions.

It is still another object of this invention is to indicate a positive or negative trailer travel angle, obtained while the tow vehicle and trailer are in the fully hitched condition and on an approximate level surface.

A companion object of this invention is to utilize the positive or negative travel angle as an aid in decreasing the aerodynamic drag of the towed vehicle during travel by adjusting the trailer and/or tow vehicle hitch mechanisms.

Still another object of this invention is to deduce the approximate positive or negative ground surface angle by algebraically subtracting the known trailer travel angle from the tilt angle reading at any location.

It is another object of the present invention to provide a new and simple apparatus, of durable and reliable construction, which may be easily and efficiently manufactured and marketed.

An even further object of this invention is to provide a new and simply designed hitching aid, which will have low inherent manufacturing cost of materials and labor, and accordingly, have a low, affordable, consumer price.

Still further objects and advantages will become apparent from a consideration of the ensuing description and accompanying drawings.

BRIEF DESCRIPTION OF THE DRAWINGS

FIG. 4-A is a view of the hook-up gauge, showing the bubble position and the squeeze-slide pointer location, with the upward slope of the trailer at load disengagement.

FIG. 4-B is a a view of the hook-up gauge after the trailer has been longitudinally leveled, showing the squeeze-slide pointer remaining at the no-load disengagement condition.

FIG. 5-A is a view of the hook-up gauge at the no-load disengagement condition, with parking on a slight down slope.

FIG. 5-B is a view of the hook-up gauge after the trailer has been leveled, showing the squeeze-slide pointer remaining at the position corresponding to the no-load disengagement condition.

FIG. 6-A is a view of the hook-up memory gauge showing the vial air bubble and squeeze pointer at the position representing a trailer travel angle.

Figure 1:
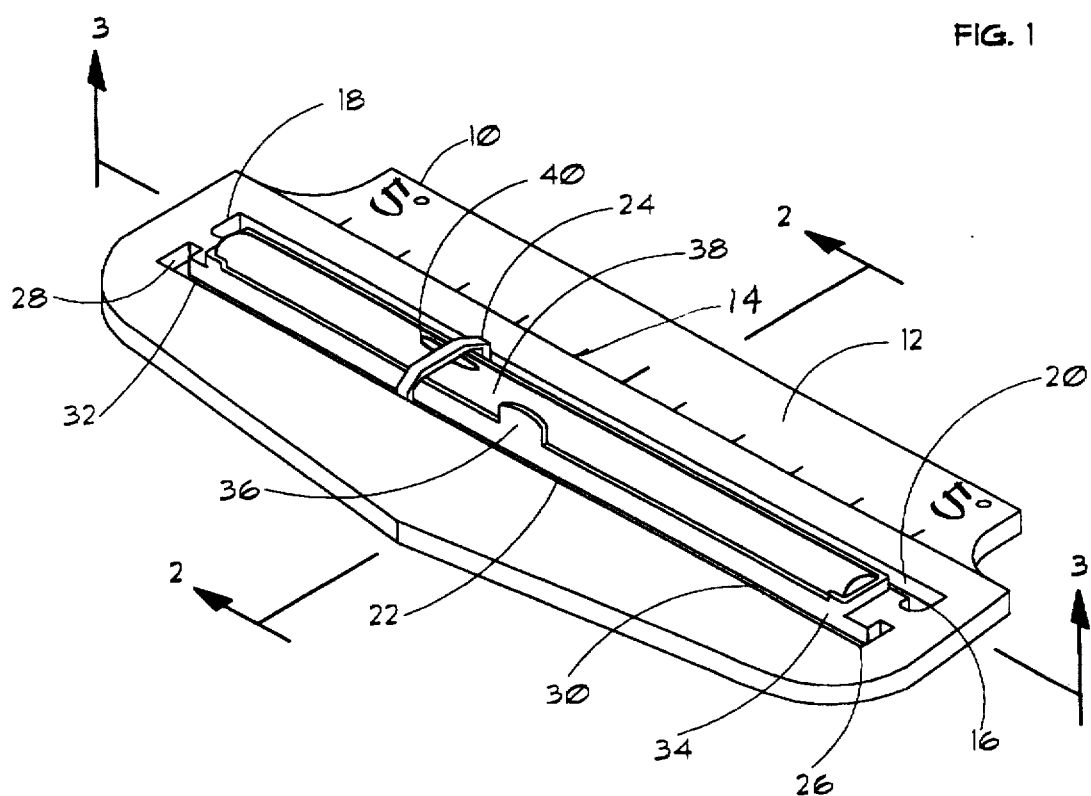
FIG. 1 is an isometric view of my invention.

REFERENCE NUMERALS 10 hook-up memory gauge
12 mounting base
14 tilt angle indicia
16 right mounting hole
18 left mounting hole
20 upper guide slot
22 lower guide slot
24 squeeze-and-slide pointer
26 right entry slot cutout
28 left entry slot cutout
30 right detent
32 left detent
34 spirit vial cradle
36 center support tab
38 arcuate spirit vial
40 vial air bubble
42 upper shoulder guide
44 lower shoulder guide
46 pointer leg
48 pointer foot
50 truck tow vehicle
52 fifth-wheel trailer
54 support legs
56 trailer hitch and kingpin
58 truck hitch
60 tow vehicle
62 conventional trailer
64 support stand
66 hitch socket
68 trailer tongue
70 hitch ball
72 trailer travel angle
74 adjustment bracket

SUMMARY

The hook-up memory gauge comprises a mounting base with an elongated, arcuate spirit vial with a small air bubble, a slidable squeeze-and-slide pointer, and a parallel, arcuate tilt angle scale graduated in degrees with a range of approximately five degrees in either direction. The gauge is mountable on the side of a trailer or trailer tongue near the support legs or support stand. Its primary use is providing a fixed registration of the position of the air bubble at the time of trailer and tow vehicle hitch disengagement. This registration is accomplished by centering and releasing the squeeze pointer fixably over the air bubble to give a convenient reference point for subsequent re-engagement of the vehicles following trailer use or storage.

PREFERRED EMBODIMENT DESCRIPTION

Referring first to FIG. 1, there is shown one embodiment of trailer hook-up memory gauge 10, constructed in accordance with the principles of the present invention. Hook-up memory gauge 10, comprises a mounting base 12 of suitable thermosettable material or metal. Mounting base 12 includes an arcuate tilt angle indicia 14, angularly spaced from calculations based on curvature, with single degree markings shown, including up to five degrees in two directions.

The center mark is at zero degrees for a levelling reference. Mounting base 12 further includes a right mounting hole 16 and a left mounting hole 18, connected with an upper guide slot 20. A lower guide slot 22 completes the two guide slots used for a squeeze-and-slide pointer 24 of thermosettable material or metal. Entry cutouts at the distal ends of lower guide slot 22, in conjunction with the a right mounting hole 16, facilitate the installation of squeeze-and-slide pointer 24. These are shown as right entry slot cutout 26 and left entry slot cutout 28. A right detent 30 and a left detent 32 are placed near lower entry slots 26 and 28 to accept the insertion of squeeze-and-slide pointer 24 into guide slots 20 and 22 on either side of mounting base 12. Detent 30 and detent 32 also act to restrict the accidental removal of squeeze-and-slide pointer 24 when it is near either end of lower guide slot 22. A spirit vial cradle 34, in conjunction with a center support tab 36, is used to hold arcuate spirit vial 38. In the present embodiment, spirit vial 38 has a radius of curvature of approximately 17 to 18 inches, and is a sealed plastic or glass vial filled with methonal except for a small air space to accomodate vial air bubble 40. For compatibility of design, a radius of curvature of between 17 to 18 inches also applies to vial cradle 34, upper guide slot 20, lower guide slot 22, and tilt angle indicia 14.

Figure 2:
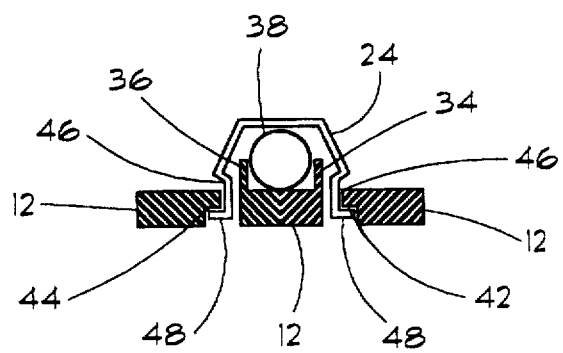
FIG. 2 is a view in detail of the portion indicated by section lines 2—2 in FIG. 1

FIG. 2 illustrates a cross section of the center of hook-up memory gauge 10, and shows mounting base 12, upper guide slot 20, lower guide slot 22, spirit vial cradle 34, center support tab 36, spirit vial 38, upper shoulder guide 42, lower shoulder guide 44, squeeze-and-slide pointer 24, pointer leg 46, and pointer foot 48. In the present embodiment, the distance between the outer edges of the pointer legs is a few hundredths of an inch more than the distance between the outer edges of the the upper and lower guide slots 20 and 22, so as to provide a compression of squeeze-and-slide pointer 24 against the guide slot edges upon release.

Figure 3:
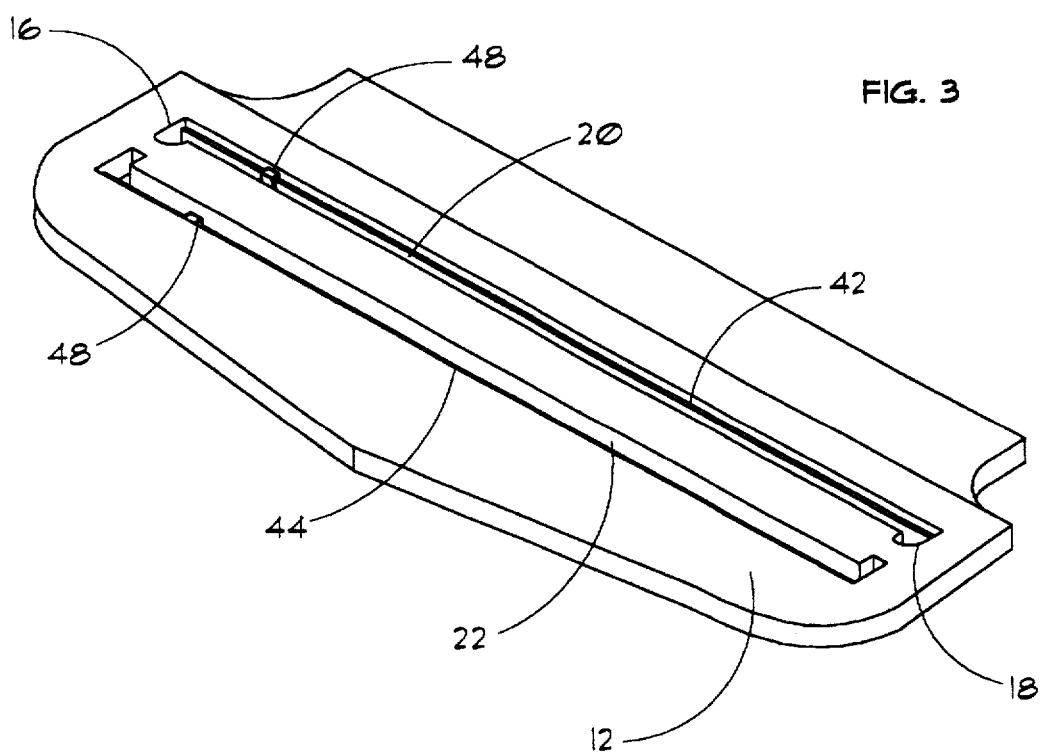
FIG. 3 is an isometric view of the portion indicated by section lines 3—3 of FIG. 1, showing the back side of FIG. 1.

FIG. 3 represents a bottom view of hook-up memory gauge 10. Pointer foot 48 is shown engaging upper shoulder guide 42 and the opposite pointer foot 48 engaging lower shoulder guide 44. FIG. 2 illustrates the orientation of each pointer foot with the upper and lower guide shoulders. The same approximate radius of curvature of 17 to 18 inches of the spirit vial also applies to the upper and lower guide shoulders.

Figure 4:
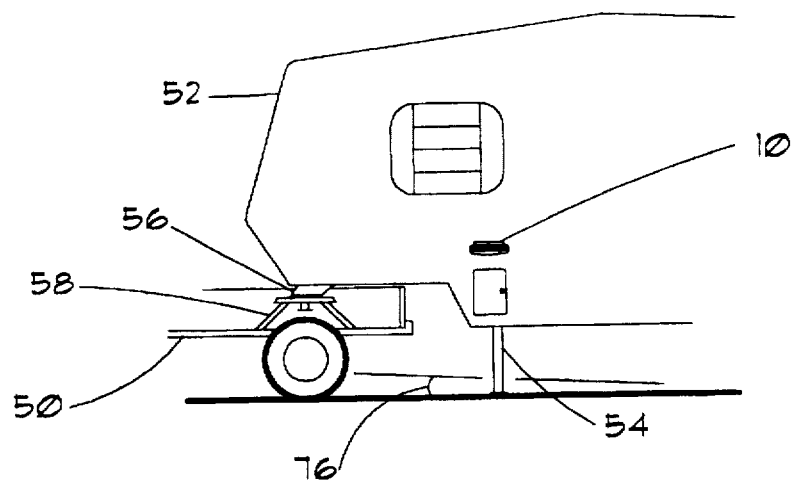
FIG. 4 is a view of a fifth wheel trailer hitch and a fifth wheel truck hitch at the point of no load on the truck hitch, with the vehicles on an upwardly sloped surface.
Figure 4:
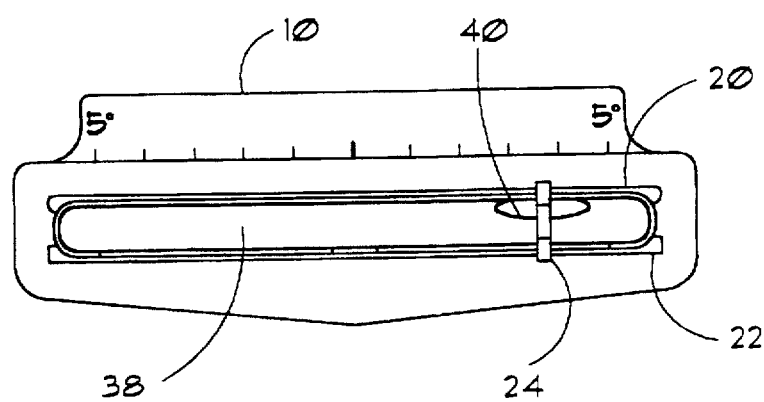
Figure 4:
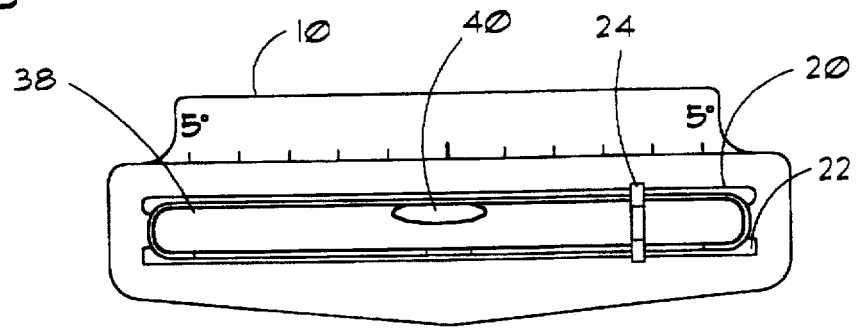

FIG. 4 is illustrative of a truck tow vehicle 50 and a fifth-wheel trailer 52 with support legs 54 extended. The legs are extended to relieve the load of a trailer hitch and kingpin 56 from a truck hitch 58 so as to produce a slight vertical separation of approximately one eight inch between the hitch plates. This condition provides the necessary clearance for vehicle disengagement. Truck tow vehicle 50 and fifth-wheel trailer 52 are shown parked on an small upward incline having a ground angle 76. As shown, the ground angle is negative relative to a level surface, causing vial air bubble 40 to move to the right, as illustrated in FIG. 4-A. The squeeze-and-slide pointer 24 is then moved and centered over the position of vial air bubble 40 and released to fixedly mark the relative tilt angle at the condition for vehicle disengagement. Subsequently, truck tow vehicle 50 may be moved away from fifth-wheel trailer 52, and the trailer leveled for use or storage. The positions of squeeze-and-slide pointer 24 and vial air bubble 40 with the trailer level are illustrated in FIG. 4-B. At re-engagement, the trailer is lowered (for this case) using support legs 54, until vial air bubble 40 returns to the position of squeeze-and-slide pointer 24, as shown in FIG. 4-A.

Figure 5:
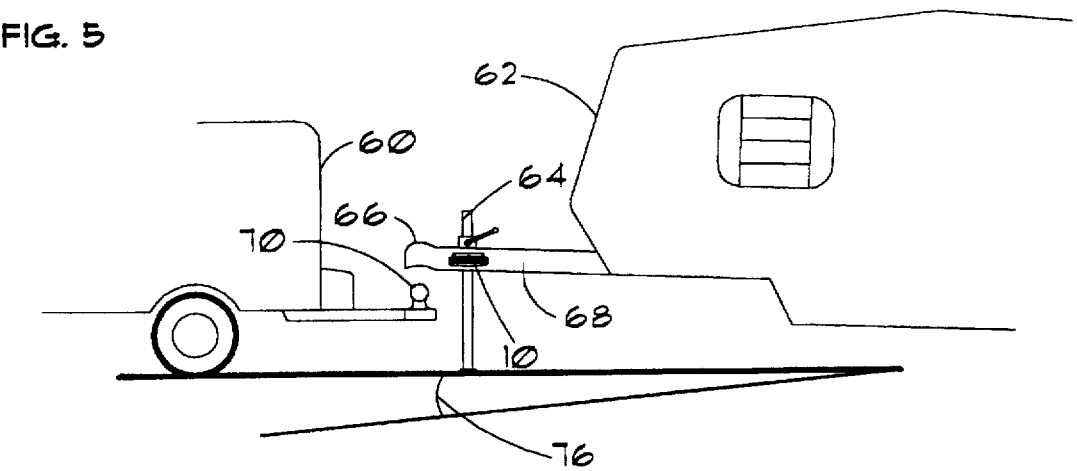
FIG. 5 is a view of a conventional trailer, parked on a slight down slope, at the no-load disengagement condition.
Figure 5:
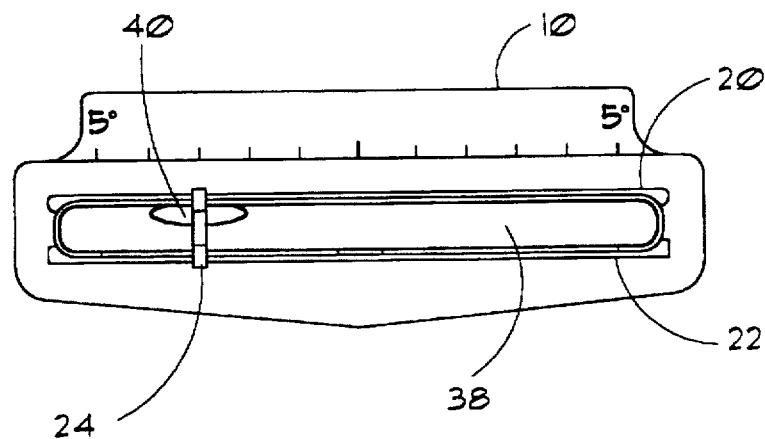
Figure 5:
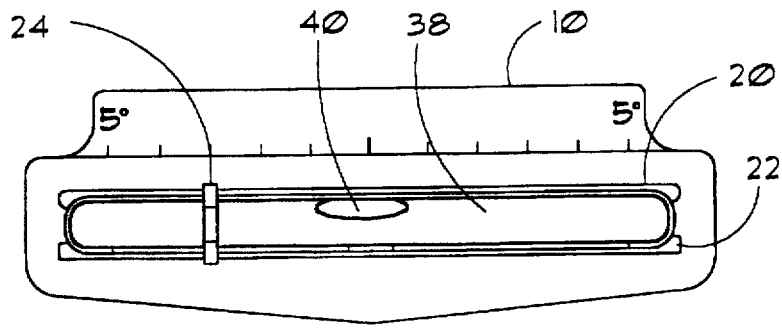

FIG. 5 is similar to FIG. 4 in that it illustrates a tow vehicle 60, and a conventional trailer 62 with support stand 64 extended so as to relieve the trailer load from the tow vehicle, and provide a vertical clearance between a hitch socket 66 on trailer tongue 68 with a tow vehicle hitch ball 70. The tow vehicle and trailer are shown parked on a slight downward incline with a positive ground angle 76. As shown, the positive ground angle is relative to a level surface, causing vial air bubble 40 to move to the left, as illustrated in FIG. 5-A. The squeeze-and-slide pointer 24 is then moved and centered over the position of vial air bubble 40 and released to fixedly mark the relative tilt angle at the condition for vehicle disengagement. Subsequently, tow vehicle 60 may be moved away from the trailer, and the trailer leveled for use or storage. The positions of squeeze-and-slide pointer 24 and vial air bubble 40 with the trailer level are illustrated in FIG. 5-B. At re-engagement, the trailer is lowered (for this case) using support stand 64, until vial air bubble 40 returns to the position of squeeze-and-slide pointer 24, as shown in FIG. 5-A.

Figure 6:
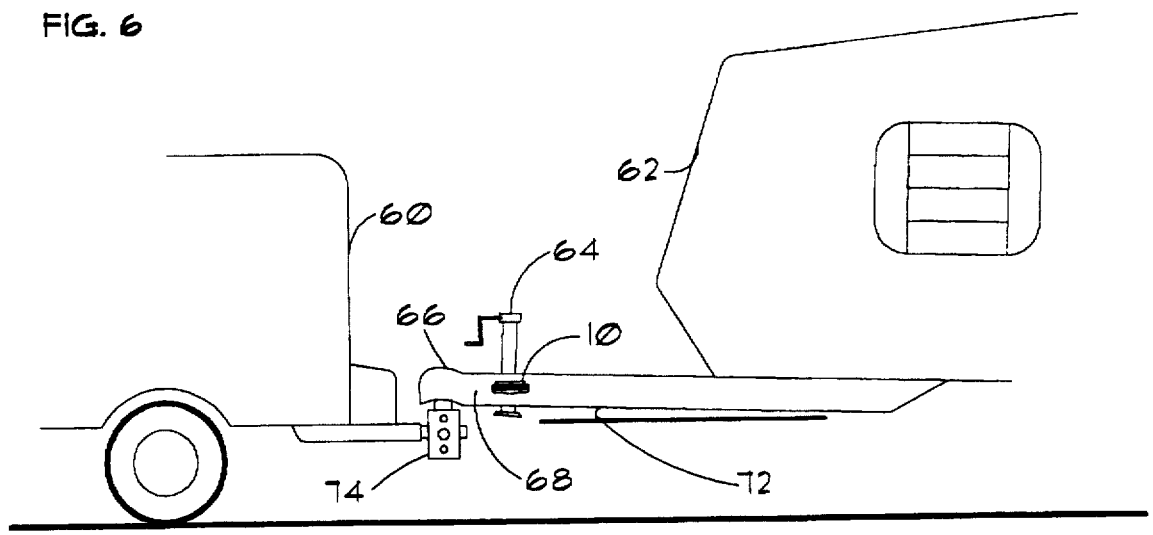
FIG. 6 is a view of a trailer hitched to a tow vehicle, with both vehicles on a level surface, and with the trailer having a positive travel angle.
Figure 6:
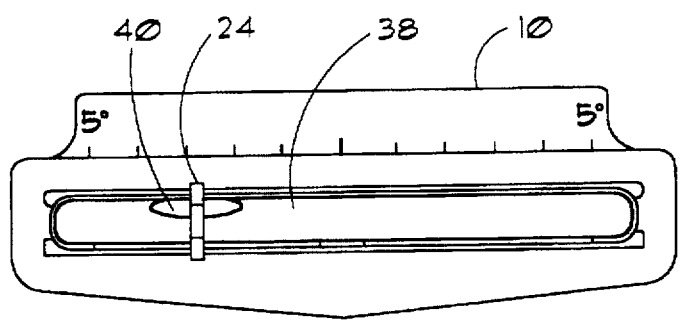

FIG. 6 illustrates a conventional trailer 62 hitched to a tow vehicle 60, with both vehicles on a level surface. Hook-up memory gauge 10 is shown mounted on a trailer tongue 68 near a support stand 64. Trailer travel angle 72 is represented as the angle between the bottom of trailer tongue 68 and the level surface as shown. An adjustment bracket 74 is available on some tow hitches, and is illustrated for the purpose of showing a method for reducing the possible trailer travel angle 72. However, it is noted that many trailer hitches do not have this adjustable bracket feature, resulting in a permanent positive or negative travel angle. FIG. 6-A is representative of a positive travel angle, as shown by the bubble and squeeze pointer location on hook-up memory gauge 10.

PREFERRED EMBODIMENT OPERATION

The novel concept of hook-up memory gauge 10, is in registering the relative vertical position of a trailer hitch and tow vehicle hitch at the time of disengagement. It serves as a reminder of this position, thereby allowing a convenient reference for re-engagement. Hook-up memory gauge 10 is applicable for almost any trailer hook-up that requires approximate levelling following disengagement from the tow vehicle. The operation of the present invention is best illustrated in the following figures.

FIG. 4 illustrates a typical mounting location of hook-up memory gauge 10 on the side of the trailer near the control compartment of support legs 54. In application, hook-up memory gauge 10 is mounted on the trailer side with the trailer pre-leveled and the hook-up gauge air bubble centered at zero degrees tilt angle. An example of the operation of the hook-up gauge is is illustrated in FIG. 4. The tow vehicle and trailer are shown parked on a slight upward inclination with support legs 54 extended to relieve the trailer load from the tow vehicle, and provide a small vertical clearance of approximately one eigth inch between the hitch mechanisms for vehicle disengagement. FIG. 4-A illustrates hook-up memory gauge 10 with vial air bubble 40 moved to the right due to the combination of ground inclination angle and trailer disengagement angle. At this point, the squeeze-and-slide pointer 24 may be lightly squeezed, moved, centered over vial air bubble 40, and released to provide a fixed disengagement reference. This ensures that trailer hitch and kingpin 56 is positioned precisely where needed for the kingpin to engage truck hitch 58 at re-engagement. The truck may subsequently be moved independently of the trailer. FIG. 4-B illustrates the relative location of vial air bubble 40 and squeeze-and-slide pointer 24 with the trailer leveled by extending support legs 54. At the time of re-engagement, support legs 54 are used to lower the trailer (for this case) until vial air bubble 40 is once again centered with squeeze-and-slide pointer 24, as shown in FIG. 4-A.

A similar example is illustrated in FIG. 5, FIG. 5-A, and FIG. 5-B. FIG. 5 shows the tow vehicle and trailer parked on a slight downward inclination angle. Support stand 64 is extended so as to relieve the trailer load from the tow vehicle, and provide approximately one eigth inch vertical clearance of hitch socket 66 and hitch ball 70. FIG. 4-A. illustrates hook-up memory gauge 10 with vial air bubble 40 moved to the left due to the combination of ground inclination angle and the trailer disengagement angle relative to the tow vehicle. At this point, squeeze-and-slide pointer 24 is moved, centered over vial air bubble 40, and released to register a fixed hitch disengagement reference. The tow vehicle may now be moved independently of the trailer to facilitate trailer leveling. FIG. 5-B illustrates the relative position of vial air bubble 40 and squeeze-and-slide pointer 24 by lowering support stand 64 to level the trailer. At the time of re-engagement, support stand 64 is extended to raise the trailer (for this case) until vial air bubble 40 is once again centered with squeeze-and-slide pointer 24, as shown in FIG. 5-A.

A conventional trailer 62 is shown hitched to tow vehicle 60 in FIG. 6. Both vehicles are on a level surface for the purpose of measuring trailer travel angle 72 without having a non-level surface angle bias included. Assuming that hook-up memory gauge 10 is mounted level, and with the trailer on a level surface, the hook-up gauge tilt angle reading will represent only the trailer travel angle 72. FIG. 6-A indicates a positive travel angle for this example.

CONCLUSIONS, RAMIFICATIONS, AND SCOPE

Accordingly, it is seen that, according to this invention, hook-up memory gauge 10 is provided as a simple, easy to use apparatus, mounted on the side of a towed vehicle near the support stand or legs, to primarily register the fore-and-aft tilt orientation of the towed vehicle. Hook-up memory gauge 10 is extremely useful and convenient using squeeze-and-slide pointer 24 aligned with vial air bubble 40 in providing a settable reminder of the trailer tilt angle at the time of tow vehicle and trailer disengagement. Following disengagement, the trailer may be leveled for use or storage. At the time of hitch re-engagement, the trailer tilt angle may be readily adjusted using the support stand or legs to raise or lower the trailer to re-align the bubble with the settable pointer. This process provides an efficient aid for quickly re-engaging the tow vehicle and the towed vehicle, thus eliminating guessing the correct vertical trailer re-engagement angle, which could result in possible mishaps with backing the tow vehicle into the trailer hitch.

Although the description above contains many specificities, these should not be construed as limiting the scope of the invention but as merely providing illustrations of some of the presently preferred embodiments of this invention. Various other embodiments and ramifications are possible within its scope. For example, hook-up memory gauge 10 will provide a fore-and-aft trailer levelling capability, while maintaining a fixed angular registration of the relative disengagement hitch positions. Also, with the tow vehicle and the towed vehicle in the hitched condition on an approximately level surface, hook-up memory gauge 10 will provide a trailer travel angle 72 which may be used as an aid in adjusting the hitch mechanisms to reduce the aerodynamic drag of the towed vehicle during travel. In addition, with the proper determination of positive or negative trailer travel angle 72, a ground angle may be calculated by algebraically subtracting trailer travel angle 72 from the hook-up gauge tilt angle reading at any trailer location.

Thus the scope of the invention should be determined by the appended claims and their legal equivalents, rather than by the examples given.

What is claimed is:

1. A hook-up memory gauge for use with a trailer and a tow vehicle, the gauge comprising:

(a) a mounting base arranged to be positioned proximal to a support stand or legs on the side of said trailer said trailer independently leveled prior to affixing the base to said trailer, the base having (b) an elongated, transparent, arcuate spirit vial containing a vial air bubble, wherein said arcuate spirit vial is connectively positioned with curvature planar to the base, and (c) the vial mountably placed in a spirit vial cradle of the base said spirit vial cradle having a side surface, end surfaces, and a center support tab all facing orthogonally to the base for supporting the vial, with (d) the base having an arcuate degree scale thereon comprising a tilt angle indicia of predetermined length similar to the vial, wherein said tilt angle indicia is proximal and parallel thereto, also (e) the base having an arcuate upper guide slot and lower guide slot contiguous with and of predetermined length similar to the cradle, the guide slots accepting a squeeze-and-slide pointer means which may be movably and transversely positioned along the vial to fixedly mark the position of said vial air bubble, wherein the position of the squeeze pointer in the elongate direction of the vial thus indicates the approximate trailer tilt angle for that condition.

2. The hook-up gauge of claim 1 wherein said squeeze-and-slide pointer means fixedly marks the position of the bubble along the vial at the time of said trailer hitch disengagement with said tow vehicle hitch to provide an easy reference for subsequent hitch re-engagement.

3. The hook-up gauge of claim 1 wherein the position of the bubble relative to said tilt angle indicia indicates a positive or negative trailer travel angle of said trailer with said trailer fully hitched to said tow vehicle, wherein both vehicles are on approximately a level surface for the angle determination, whereas (a) an adjustment of the relative hitch positions so as to reduce the travel angle may result in a reduction of the trailer aerodynamic drag during travel, wherein (b) any tilt angle reading corresponding to the position of said vial air bubble relative to said tilt angle indicia is positive if the bubble lies in the forward half of said arcuate spirit vial, as measured from the zero center mark of said tilt angle indicia, with forward being toward the front of said trailer, and (c) any tilt angle reading corresponding to the position of said vial air bubble relative to said tilt angle indicia is negative if the bubble lies in the rearward half of said arcuate spirit vial, as measured from the zero center mark of said tilt angle indicia, with rearward being toward the rear of said trailer, thus (d) a ground tilt angle may be calculated at any other trailer location by algebraically subtracting the trailer travel angle from said tilt angle indicia reading.

* * * * *